United States Patent [19]
Takaki et al.

[11] Patent Number: 4,508,876
[45] Date of Patent: Apr. 2, 1985

[54] GRAFT COPOLYMER USEFUL AS REINFORCEMENTS FOR VINYL CHLORIDE POLYMERS AND PROCESS FOR PREPARING THE SAME

[75] Inventors: Akira Takaki; Hideki Hosoi, both of Kobe, Japan

[73] Assignee: Kanegafuchi Kagaku Kogyo Kabushiki Kaisha, Osaka, Japan

[21] Appl. No.: 511,479

[22] Filed: Jul. 7, 1983

[30] Foreign Application Priority Data

Jul. 13, 1982 [JP] Japan .................. 57-122445
Jun. 1, 1983 [JP] Japan .................. 58-98200

[51] Int. Cl.$^3$ ................ C08F 279/06; C08F 279/00
[52] U.S. Cl. .................. 525/310; 525/267; 525/273; 525/316; 525/902
[58] Field of Search ............. 525/310, 316, 902, 267, 525/273

[56] References Cited

U.S. PATENT DOCUMENTS 4,145,380  3/1979  Myers et al. .................. 525/310

FOREIGN PATENT DOCUMENTS 50262  4/1982  European Pat. Off. ............ 525/902
68357  1/1983  European Pat. Off. ............ 525/310

*Primary Examiner*—Wilbert J. Briggs, Sr.
*Attorney, Agent, or Firm*—Antonelli, Terry & Wands

[57] ABSTRACT

A MBS resin useful as a reinforcement for vinyl chloride polymers and capable of improving the impact resistance of the vinyl chloride polymers without impairing the transparency thereof, which is prepared by graft-polymerizing a monomer mixture comprising an aromatic vinyl compound and an alkyl methacrylate onto a butadiene copolymer comprising styrene and butadiene, the butadiene copolymer being present in the polymerization system in a higher proportion as compared with a conventional MBS resin and present in the form of an aqueous latex of particles having a structure such that a portion formed in the last stage of a polymerization for the preparation of the butadiene copolymer amounting to 20% by weight of the produced butadiene copolymer, has a very high butadiene content of 80 to 100% by weight and moreover has at least 5% by weight higher butadiene content than the average butadiene content of the produced butadiene copolymer.

4 Claims, No Drawings

GRAFT COPOLYMER USEFUL AS REINFORCEMENTS FOR VINYL CHLORIDE POLYMERS AND PROCESS FOR PREPARING THE SAME

BACKGROUND OF THE INVENTION

The present invention relates to a so-called MBS resin useful as a reinforcement for vinyl chloride polymers and a process for the preparation thereof, and more particularly to a MBS resin which can impart a more excellent impact resistance to vinyl chloride polymers as compared with a conventional MBS resin without impairing an excellent transparency of the vinyl chloride polymers.

It is known that graft copolymers of methyl methacrylate, styrene, acrylonitrile or the like grafted onto a butadiene rubber, as generally called MBS resin, are useful as reinforcements for improving the impact resistance of vinyl chloride polymers. However, a MBS resin which can impart an excellent impact resistance to vinyl chloride polymers has a tendency to lowering the transparency of the obtained moldings. Accordingly, it is desired to further improve both of the impact resistance and the transparency.

It is an object of the present invention to provide a reinforcement or modifier for vinyl chloride polymers.

A further object of the invention is to provide a MBS resin useful as a vinyl chloride polymer reinforcement or modifier capable of improving the impact resistance without impairing transparency of the vinyl chloride polymers.

Another object of the invention is to provide a process for preparing a MBS resin useful as a reinforcement or modifier for vinyl chloride polymers.

These and other objects of the present invention will become apparent from the description hereinafter.

SUMMARY OF THE INVENTION

It has now been found that a reinforcement for vinyl chloride polymers capable of improving the impact resistance without impairing the transparency can be obtained when the graft polymerization for preparing a MBS resin is conducted in the presence of particles of a butadiene backbone copolymer, the surface portion of which is formed by a butadiene copolymer having a very high butadiene content, to produce a graft copolymer containing the butadiene backbone copolymer in a higher proportion as compared with conventional MBS resins.

In accordance with the present invention, there is provided a graft copolymer comprising an aromatic vinyl monomer and an alkyl methacrylate grafted onto a butadiene copolymer, said graft copolymer being prepared by emulsion-polymerizing 20 to 60 parts by weight of a monomer mixture of 20 to 80% by weight of an aromatic vinyl monomer, 80 to 20% by weight of an alkyl methacrylate and 0 to 20% by weight of other vinyl monomer copolymerizable therewith in the presence of an aqueous latex of 80 to 40 parts by weight of a butadiene copolymer of 5 to 35% by weight of styrene, 95 to 65% by weight of butadiene and 0 to 20% by weight of other vinyl monomer copolymerizable therewith, the butadiene content in the 20% by weight portion of said butadiene copolymer being from 80 to 100% by weight and being higher than the average butadiene content of the whole butadiene copolymer by at least 5% by weight, said 20% by weight portion being a portion formed in the latest stage of a polymerization for the preparation of said butadiene copolymer.

DETAILED DESCRIPTION

The butadiene copolymers used in the present invention are copolymers of 5 to 35% by weight, preferably 20 to 30% by weight, of styrene, 95 to 65% by weight, preferably 80 to 70% by weight, of butadiene and 0 to 20% by weight of (a) other vinyl monomer copolymerizable therewith.

Examples of the vinyl monomer (a) are, for instance, an alkyl acrylate such as methyl acrylate, an alkyl methacrylate such as methyl methacrylate, a vinyl cyan such as acrylonitrile, a crosslinking agent such as divinyl benzene, monoethylene glycol dimethacrylate or polyethylene glycol dimethacrylate, and the like. The carbon number of the alkyl group of the alkyl acrylate and methacrylate is usually from 1 to 8. The vinyl monomers (a) may be employed alone or in admixture thereof. The use of s small amount of one or more kinds of the crosslinking agent is preferred.

The butadiene copolymers are prepared by a method in which the monomers are divided into at least two portions and the portions are added to the polymerization system so that the styrene monomer is present relatively in abundance in the former stage of the polymerization and the butadiene monomer is present relatively in abundance in the latter stage of the polymerization. The preparation of the butadiene copolymers is preferably conducted by an emulsion polymerization process, but is not particularly limited thereto. Also, the monomers may be added either continuously or intermittently.

It is preferable that a 20% by weight portion, which is produced in the latest stage of the polymerization, of the butadiene copolymer prepared by the above method has a butadiene content of 80 to 100% by weight, especially 85 to 100% by weight, and moreover, the butadiene content of this 20% portion is higher than the average butadiene content of the prepared whole butadiene copolymer by at least 5% by weight, especially at least 10% by weight, more especially at least 15% by weight. The more the butadiene content of this 20% portion approaches 100% by weight, the larger the effect on the improvement in the transparency of vinyl chloride polymer moldings. When the butadiene content of this 20% portion is less than 80% by weight, the effect on the improvement in the transparency is not observed.

The thus obtained aqueous latex of the butadiene copolymer is employed in the preparation of the MBS resin of the invention. Preferably, the weight average particle size of the butadiene copolymer is from 500 to 2,500 angstroms. The average particle size can be measured by an electron microscope.

The MBS resin of the present invention is prepared by emulsion-polymerizing 20 to 60 parts by weight, preferably 25 to 50 parts by weight, of a monomer mixture of 20 to 80% by weight, preferably 40 to 60% by weight, of an aromatic vinyl monomer, 80 to 20% by weight, preferably 60 to 40% by weight, of an alkyl methacrylate and 0 to 20% by weight of (b) other vinyl monomer copolymerizable therewith in the presence of 80 to 40 parts by weight of the butadiene copolymer in the form of an aqueous latex to graft them onto the butadiene copolymer.

The preferred aromatic viny monomer is styrene. The alkyl methacrylate includes, for instance, methyl, ethyl and butyl methacrylates, and methyl methacrylate is preferred. The other vinyl monomers (b) copolymerizable with the aromatic vinyl monomer and the alkyl methacrylate include, for instance, a crosslinking agent such as divinyl benzene, monoethylene glycol dimethacrylate, polyethylene glycol dimethacrylate or 1,3-butylene glycol dimethacrylate, a vinyl cyan such as acrylonitrile, an alkyl acrylate such as ethyl acrylate or butyl acrylate, and the like. The vinyl monomers (b) may be employed alone or in admixture thereof.

In the graft polymerization, the monomers may be added to the polymerization system at once, intermittently or continuously. It is preferable that the monomers are divided into a portion containing an alkyl methacrylate as a main component and a portion containing an aromatic vinyl monomer as a main component and the portions are added separately to the system. In particular, from the viewpoint of the stability of the latex, it is preferable to firstly add the portion containing an alkyl methacrylate as a main component.

The graft polymerization may be carried out in a usual manner. Also, there may be applied a method in which the butadiene copolymer particles are agglomerated prior to the graft polymerization or a method in which a water-soluble electrolyte such as KCl, NaCl or Na$_2$SO$_4$ is added to the system in the course of the graft polymerization to agglomerate the polymer particles. The most preferable graft polymerization method is a method wherein a water-soluble electrolyte is added to an aqueous latex of the butadiene copolymer particles having a weight average particle size of 500 to 2,500 angstroms, a monomer mixture containing predominantly methyl methacrylate is then added and graft-polymerized, during which the polymer particles are agglomerated, and a monomer mixture containing predominantly styrene is added and graft-polymerized. It is preferable that the particle size of the MBS resin in the latex obtained by the graft polymerization is from 1,000 to 3,000 angstroms, and that the particle size of the MBS resin is 1.2 to 5 times larger than the initial particle size of the butadiene copolymer.

The monomer composition of the butadiene copolymer and the composition of the monomer mixture used in the graft polymerization are preferably adjusted so that moldings prepared from a blend of the obtained MBS resin and a vinyl chloride polymer becomes transparent, in other words, so that the refractive index of the MBS resin to visible rays approaches that of the vinyl chloride polymer.

The graft polymer so obtained, namely a MBS resin, is used, after or without subjecting to a post-treatment, in an amount of 1 to 50 parts by weight per 100 parts by weight of a vinyl chloride polymer. Usually, the graft polymer is blended with a vinyl chloride polymer after subjecting the obtained aqueous latex of the graft polymer to a suitable post-treatment in which the graft polymer is obtained in the form of a powder by, for instance, adding an aqueous solution of a salt or an acid to the latex to coagulate the graft polymer and then heat-treating, dehydrating, washing and drying the cagulated graft polymer.

The present invention is more specifically described and explained by means of the following Examples and Comparative Examples, in which all parts and % are by weight unless otherwise noted. It is to be understood that the present invention is not limited to the Examples, and various changes and modifications may be made in the invention without departing from the spirit and scope thereof.

EXAMPLE 1

A polymerization vessel equipped with a stirrer was charged with 200 parts of water, 1.5 parts of sodium oleate, 0.002 part of ferrous sulfate (FeSO$_4$. 7H$_2$O), 0.005 part of disodium ethylenediaminetetraacetate, 0.2 part of formaldehyde sodium sulfoxylate, 0.2 part of tripotassium phosphate, 57 parts of butadiene, 23 parts of styrene, 1.0 part of divinyl benzene and 0.1 part of diisopropylbenzene hydroperoxide. The polymerization was carried out at 50° C. for 10 hours. After confirming that the polymerization conversion was not less than 95%, 20 parts of butadiene and 0.05 part of diisopropylbenzene hydroperoxide were added to the system and the polymerization was further continued for 7 hours to give an aqueous latex of a butadiene copolymer having a weight average particle size of 800 angstroms (hereinafter referred to as "rubber latex A1").

The polymerization conversion of the obtained rubber latex A1 was 99%, and the butadiene copolymer had a composition of 77.3% of butadiene, 21.8% of styrene and 0.9% of divinyl benzene. Also, the butadiene content in the butadiene copolymer formed after 80% of the whole butadiene copolymer to be produced was formed, namely the butadiene content in a 20% portion formed in the last polymerization stage, was 95%.

A polymerization vessel was charged with 210 parts of the obtained rubber latex (solid matter: 70 parts), 60 parts of water, 0.002 part of ferrous sulfate, 0.004 part of disodium ethylenediaminetetraacetate, 0.1 part of formaldehyde sodium sulfoxylate and 1.5 parts of potassium chloride. To the vessel were continuously added 15 parts of methyl methacrylate and 0.1% part of cumene hydroperoxide at 70° C. over 3 hours, and the polymerization was further continued for 1 hour at that temperature. To the vessel were then continuously added 15 parts of styrene and 0.1 part of cumene hydroperoxide over 3 hours. and the polymerization was completed after further continuing the polymerization for 1 hour, to give an aqueous latex of a graft copolymer.

Sulfuric acid was added to the latex to deposit the graft copolymer. and the graft copolymer was filtered and dried to give a white powder (hereinafter referred to as "MBS resin").

To 92 parts of polyvinyl chloride (average degree of polymerization: 700) containing 1.2 parts of octyl tin mercaptide stabilizer, 0.8 part of glycerol linoleate and 0.2 part of a montanic acid ester was added 8 parts of the obtained MBS resin. The mixture was kneaded for 8 minutes by rolls of 160° C., and was pressed for 15 minutes by heat pressure rolls of 190° C. to give an Izod impact test specimens having a thickness of 6 mm. and a transparent sheet having a thickness of 5 mm. The Izod impact strength was measured at 23° C. according to JIS K 7110. The light transmission and haze value were measured according to JIS K 6714.

The results are shown in Table 1 wherein "MMA", "St" and "BA" represent methyl methacrylate, styrene and butyl acrylate, respectively.

EXAMPLE 2

A polymerization vessel was charged with 210 parts of the rubber latex A1 obtained in Example 1 (solid matter: 70 parts), 60 parts of water, 0.002 part of ferrous sulfate, 0.004 part of disodium ethylenediaminetetraacetate, 0.1 part of formaldehyde sodium sulfoxylate and 1.5 parts of potassium chloride. To the vessel were continuously added 13 parts of methyl methacrylate, 2 parts of butyl acrylate and 0.1 part of cumene hydroperoxide over 3 hours at 70° C. After further continuing the polymerization for 1 hour, 15 parts of styrene and 0.1 part of cumene hydroperoxide were then continuously added to the vessel over 3 hours. The polymerization was further continued for 1 hour to give an aqueous latex of a graft copolymer. A MBS resin was recovered from the latex and the test was made in the same manner as in Example 1.

The results are shown in Table 1.

EXAMPLE 3

A polymerization vessel was charged with 210 parts of the rubber latex A1 obtained n Example 1 (solid matter: 70 parts), 60 parts of water, 0.002 part of ferous sulfate, 0.004 part of disodium ethylenediaminetetraacetate, 0.1 part of formaldehyde sodium sulfoxylate and 1.5 parts of potassium chloride. To the vessel were continuously added 13 parts of methyl methacrylate and 0.1 part of cumene hydroperoxide at 70° C. over 3 hours. After further continuing the polymerization for 1 hour, 2 parts of butyl acrylate and 0.002 part of cumene hydroperoxide were continuously added to the vessel over 20 minutes. The polymerization was further continued for 30 minutes, and 15 parts of styrene and 0.1 part of cumene hydroperoxide were then continuously added to the vessel over 3 hours. The polymerization was further continued for 1 hour to give an aqueous latex of a graft copolymer. A MBS resin was recovered from the latex and the test was made in the same manner as in Example 1.

The results are shown in Table 1.

EXAMPLE 4

A polymerization vessel was charged with 210 parts of the rubber latex A1 obtained in Example 1 (solid matter: 70 parts), 60 parts of water, 0.002 part of ferrous sulfate, 0.004 part of disodium ethylenediaminetetraacetate, 0.1 part of formaldehyde sodium sulfoxylate and 1.5 parts of potassium chloride. To the vessel were continuously added 13 parts of methyl methacrylate and 0.1 part of cumene hydroperoxide at 70° C. over 3 hours. After continuing the polymerization for 1 hour, 15 parts of styrene, 2 parts of butyl acrylate and 0.1 part of cumene hydroperoxide were continuously added to the vessel over 3 hours. The polymerization was further continued for 1 hour to give an aqueous latex of a graft copolymer. A MBS resin was recovered from the latex and the test was made in the same manner as in Example 1.

The results are shown in Table 1.

EXAMPLE 5

A polymerization vessel equipped with a stirrer was charged with 200 parts of water, 1.5 parts of sodium oleate, 0.002 part of ferrous sulfate, 0.005 part of disodium ethylenediaminetetraacetate, 0.2 part of tripotassium phosphate, 0.2 part of formaldehyde sodium sulfoxylate, 59 parts of butadiene, 21 parts of styrene, 1.0 part of divinyl benzene and 0.1 part of diisopropylbenzene hydroperoxide. The polymerization was carried out at 50° C. for 10 hours. After confirming that the polymerization conversion was not less than 95%, 18 parts of butadiene, 2 parts of styrene and 0.05 part of diisopropylbenzene hydroperoxide were added to the system, and the polymerization was further continued for 7 hours to give an aqueous latex of a butadiene copolymer having a weight average particle size of 800 angstroms (hereinafter referred to as "rubber latex A2").

The polymerization conversion of the obtained rubber latex A2 was 99%, and the butadiene copolymer had a composition of 77.3% of butadiene, 21.8% of styrene and 0.9% of divinyl benzene. Also, the butadiene content in the butadiene copolymer which was formed after 80% of the whole butadiene copolymer to be produced was formed, was 85%.

The graft polymerization was carried out in the same manner as in Example 1 except that 210 parts of the rubber latex A2 (solid matter: 70 parts) was employed instead of the rubber latex A1, to give an aqueous latex of a graft copolymer. A MBS resin was recovered from the latex and the test was made in the same manner as in Example 1.

The results are shown in Table 1.

COMPARATIVE EXAMPLE 1

A polymerization vessel equipped with a stirrer was charged with 200 parts of water, 1.5 parts of sodium oleate, 0.002 part of ferrous sulfate, 0.005 part of disodium ethylenediaminetetraacetate, 0.2 part of tripotassium phosphate, 0.2 part of formaldehyde sodium sulfoxylate, 77 parts of butadiene, 23 parts of styrene, 1.0 part of divinyl benzene and 0.1 part of diisopropylbenzene hydroperoxide. The polymerization was carried out at 50° C. After 10 hours from starting the polymerization, 0.05 part of diisopropylbenzene hydroperoxide was added to the system, and the polymerization was further continued for 7 hours to give an aqueous latex of a butadiene copolymer having a weight average particle size of 780 angstroms (hereinafter referred to as "rubber latex B1").

The polymerization conversion of the obtained rubber latex B1 was 99%, and the butadiene copolymer had a composition of 77.4% of butadiene, 21.7% of styrene and 0.9% of divinyl benzene. Also, the butadiene content in a 20% portion of the product, which was formed in the latest polymerization stage, was 77.2%.

A polymerization vessel was charged with 180 parts of the obtained rubber latex B1 (solid matter: 60 parts), 90 parts of water, 0.002 part of ferrous sulfate, 0.004 part of disodium ethylenediaminetetraacetate, 0.1 part of formaldehyde sodium sulfoxylate and 1.2 parts of potassium chloride. To the vessel were continuously added 20 parts of methyl methacrylate and 0.1 part of cumene hydroperoxide at 70° C. over 3 hours. After further continuing the polymerization for 1 hour, 20 parts of styrene and 0.1 part of cumene hydroperoxide were then continuously added to the vessel over 3 hours. The polymerization was further continued for 1 hour to give an aqueous latex of a graft copolymer. A MBS resin was recovered from the latex and the test was made in the same manner as in Example 1.

The results are shown in Table 1.

COMPARATIVE EXAMPLE 2

A polymerization vessel was charged with 210 parts of the rubber latex B1 obtained in Comparative Example 1 (solid matter: 70 parts), 60 parts of water, 0.002 part of ferrous sulfate, 0.004 part of disodium ethylenediaminetetraacetate, 0.1 part of formaldehyde sodium sulfoxylate and 1.5 parts of potassium chloride. To the vessel were continuously added 15 parts of methyl methacrylate and 0.1 part of cumene hydroperoxide at 70° C. over 3 hours. After further continuing the polymerization for 1 hour, 15 parts of styrene and 0.1 part of cumene hydroperoxide were continuously added to the vessel over 3 hours. The polymerization was further continued for 1 hour to give an aqueous latex of a graft copolymer. A MBS resin was recovered from the latex and the test was made in the same manner as in Example 1.

The results are shown in Table 1.

COMPARATIVE EXAMPLE 3

A polymerization vessel equipped with a stirrer was charged with 200 parts of water, 1.5 parts of sodium oleate, 0.002 part of ferrous sulfate, 0.005 part of disodium ethylenediaminetetraacetate, 0.2 part of tripotassium phosphate, 63 parts of butadiene, 17 parts of styrene, 1.0 part of divinyl benzene and 0.1 part of diisopropylbenzene hydroperoxide. The polymerization was carried out at 50° C. for 10 hours. After confirming that the polymerization conversion was not less than 95%, 14 parts of butadiene, 6 parts of styrene and 0.05 part of diisopropylbenzene hydroperoxide were added to the vessel, and the polymerization was further continued for 7 hours to give an aqueous latex of a butadiene copolymer having a weight average particle size of 800 angstroms (hereinafter referred to as "rubber latex B2").

The polymerization conversion of the obtained rubber latex B2 was 99%, and the butadiene copolymer had a composition of 77.3% of butadiene, 21.8% of styrene and 0.9% of divinyl benzene. Also, the butadiene content in a 20% portion of the product, which was formed in the latest polymerization stage, was 68%.

The graft polymerization was carried out in the same manner as in Example 1 except that 210 parts of the rubber latex B2 (solid matter: 70 parts) was employed instead of the rubber latex A1, to give an aqueous latex of a graft copolymer. A MBS resin was recovered from the latex and the test was made in the same manner as in Example 1.

The results are shown in Table 1.

COMPARATIVE EXAMPLE 4

A polymerization vessel equipped with a stirrer was charged with 200 parts of water, 1.5 parts of sodium oleate, 0.002 part of ferrous sulfate, 0.005 part of disodium ethylenediaminetetraacetate, 0.2 part of formaldehyde sodium sulfoxylate, 0.2 part of tripotassium phosphate, 69 parts of butadiene, 21 parts of styrene, 1.0 part of divinyl benzene and 0.1 part of diisopropylbenzene hydroperoxide. The polymerization was carried out at 50° C. for 10 hours. After confirming that the polymerization conversion was not less than 95%, 8 parts of butadiene, 2 parts of styrene and 0.05 part of diisopropylbenzene hydroperoxide were added to the vessel. The polymerization was further continued for 7 hours to give an aqueous latex of a butadiene copolymer having a weight average particle size of 800 angstroms (hereinafter referred to as "rubber latex B3").

The polymerization conversion of the obtained rubber latex B3 was 99%, and the butadiene copolymer had a composition of 77.3% of butadiene, 21.8% of styrene and 0.9% of divinyl benzene. Also, the butadiene content in a 20% portion of the product, which was formed in the latest polymerization stage, was 78%.

The graft polymerization was carried out in the same manner as in Example 1 except that 210 parts of the rubber latex B3 (solid matter: 70 parts) was employed instead of the rubber latex A1, to give an aqueous latex of a graft copolymer. A MBS resin was recovered from the latex and the test was made in the same manner as in Example 1.

The results are shown in Table 1.

TABLE 1

| | Composition of MBS resin (part) | | | Physical properties of moldings | | |
|---|---|---|---|---|---|---|
| Rubber latex | Grafting component | | | Izod impact strength | Light transmission (%) | Haze value |
| (solid content) | 1st stage | 2nd stage | 3rd stage | (kg · cm/cm$^2$) | | |
| Ex. 1 Rubber latex A1 (70) | MMA (15) | St (15) | — | 52 | 80 | 4.5 |
| Ex. 2 Rubber latex A1 (70) | MMA (13) BA (2) | St (15) | — | 55 | 79 | 5.0 |
| Ex. 3 Rubber latex A1 (70) | MMA (13) | BA (2) | St (15) | 56 | 79 | 5.0 |
| Ex. 4 Rubber latex A1 (70) | MMA (13) | St (15) BA (2) | — | 55 | 79 | 5.0 |
| Ex. 5 Rubber latex A2 (70) | MMA (15) | St (15) | — | 49 | 79 | 5.0 |
| Com. Ex. 1 Rubber latex B1 (60) | MMA (20) | St (20) | — | 30 | 79 | 5.0 |
| Com. Ex. 2 Rubber latex B1 (70) | MMA (15) | St (15) | — | 45 | 76 | 7.0 |
| Com. Ex. 3 Rubber latex B2 (70) | MMA (15) | St (15) | — | 45 | 74 | 8.0 |
| Com. Ex. 4 Rubber latex B3 (70) | MMA (15) | St (15) | — | 44 | 77 | 6.5 |

It is observed in Table 1 that the MBS resin of the present invention has an excellent effect of improving the impact resistance of a vinyl chloride polymer without impairing the transparency.

In addition to the ingredients used in the Examples, other ingredients can be used in the Examples as set forth in the specification to obtain substantially the same results.

What we claim is:

1. A graft copolymer comprising an aromatic vinyl monomer and an alkyl methacrylate grafted onto a butadiene copolymer, said graft copolymer being prepared by emulsion-polymerizing 20 to 60 parts by weight of a monomer mixture of 20 to 80% by weight of an aromatic vinyl monomer, 80 to 20% by weight of an alkyl methacrylate and 0 to 20% by weight of other vinyl monomer copolymerizable therewith in the presence of an aqueous latex of 80 to 40 parts by weight of a butadiene copolymer prepared from a monomeric mixture containing 5 to 35% by weight of styrene, 95 to 65% by weight of butadiene and 0 to 20% by weight of at least one other vinyl monomer copolymerizable therewith, said butadiene copolymer being a multistage polymer which is produced in at least two stages, in the last stage of which 20% by weight of the entire multistage butadiene copolymer is produced and the product of which has a butadiene content that is from 80% to 100% by weight and that is at least 5% by weight higher than the butadiene content of the entire multistage butadiene copolymer.

2. The graft copolymer of claim 1, wherein said butadiene copolymer consists of 20 to 30% by weight of styrene, 80 to 70% by weight of butadiene and 0 to 20% by weight of said other vinyl monomer copolymerizable therewith, and the butadiene content in said product produced in the last stage is from 85 to 100% by weight.

3. A process for preparing a MBS resin which comprises emulsion-polymerizing 20 to 60 parts by weight of a monomer mixture of 20 to 80% by weight of an aromatic vinyl monomer, 80 to 20% by weight of an alkyl methacrylate and 0 to 20% by weight of other vinyl monomer copolymerizable therewith in the presence of an aqueous latex of 80 to 40% by weight of a butadiene copolymer prepared from a monomeric mixture containing 5 to 35% by weight of styrene, 95 to 65% by weight of butadiene and 0 to 20% by weight of at least one other vinyl monomer copolymerizable therewith, said butadiene copolymer being a multistage polymer which is produced in at least two stages, in the last stage of which 20% by weight of the entire multistage butadiene copolymer is produced and the product of which has a butadiene content that is from 80 to 100% by weight and that is at least 5% by weight higher than butadiene content of the entire multistage butadiene copolymer.

4. The process of claim 3, wherein said butadiene copolymer consists of 20 to 30% by weight of styrene, 80 to 70% by weight of butadiene and 0 to 20% by weight of said other vinyl monomer copolymerizable therewith, and the butadiene content in said product formed in the last stage is from 85 to 100% by weight.

* * * * *